(12) United States Patent
Saga

(10) Patent No.: US 7,957,420 B2
(45) Date of Patent: Jun. 7, 2011

(54) PACKET TRANSFER METHOD AND PACKET TRANSFER NODE

(75) Inventor: Kazuhiro Saga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 841 days.

(21) Appl. No.: 11/529,387

(22) Filed: Sep. 29, 2006

(65) Prior Publication Data

US 2007/0223531 A1 Sep. 27, 2007

(30) Foreign Application Priority Data

Mar. 23, 2006 (JP) ................................. 2006-081652

(51) Int. Cl.
*H04J 3/22* (2006.01)
*G06F 15/173* (2006.01)

(52) U.S. Cl. ........................................ 370/469; 709/238

(58) Field of Classification Search .................. 370/238, 370/238.1, 351, 352, 355, 356, 392, 397, 370/399, 395.31, 395.32, 465, 469; 709/202, 709/203, 206, 218, 219, 220–224, 232, 238, 709/241, 242
See application file for complete search history.

(56) References Cited

U.S. PATENT DOCUMENTS

| | | | | |
|---|---|---|---|---|
| 5,430,727 A | * | 7/1995 | Callon | 370/401 |
| 6,011,795 A | * | 1/2000 | Varghese et al. | 370/392 |
| 6,084,867 A | * | 7/2000 | Meier | 370/338 |
| 6,598,080 B1 | * | 7/2003 | Nagami et al. | 709/227 |
| 6,820,120 B1 | * | 11/2004 | Keats et al. | 709/223 |
| 2002/0150094 A1 | * | 10/2002 | Cheng et al. | 370/389 |
| 2003/0031125 A1 | * | 2/2003 | Oyamada | 370/218 |
| 2005/0270986 A1 | * | 12/2005 | Watanabe et al. | 370/252 |
| 2007/0153741 A1 | * | 7/2007 | Blanchette et al. | 370/331 |

FOREIGN PATENT DOCUMENTS

JP 8-125692 5/1996

OTHER PUBLICATIONS

Japanese Office Action issued Oct. 19, 2010 in corresponding Japanese Patent Application 2006-081652 (2 pages) (English translation 3 pages).

* cited by examiner

*Primary Examiner* — Aung S Moe
*Assistant Examiner* — Prince Mensah
(74) *Attorney, Agent, or Firm* — Staas & Halsey LLP

(57) ABSTRACT

The present invention provides a method of performing packet transfer among nodes on a network by a packet transfer node. When the network is divided into a plurality of network areas and routing within an individual network area and between network areas is performed, the method divides packet transfer processing of the packet transfer node into a higher layer and a lower layer, selects one of the higher layer and the lower layer for each packet to be transferred in accordance with information set in the packet transfer node, and performs the packet transfer by the selected hierarchical layer. According to the present invention, an added packet transfer node can be coupled with a network area which is not adjacent to the added packet transfer node to increase flexibility of expanding the network.

16 Claims, 15 Drawing Sheets

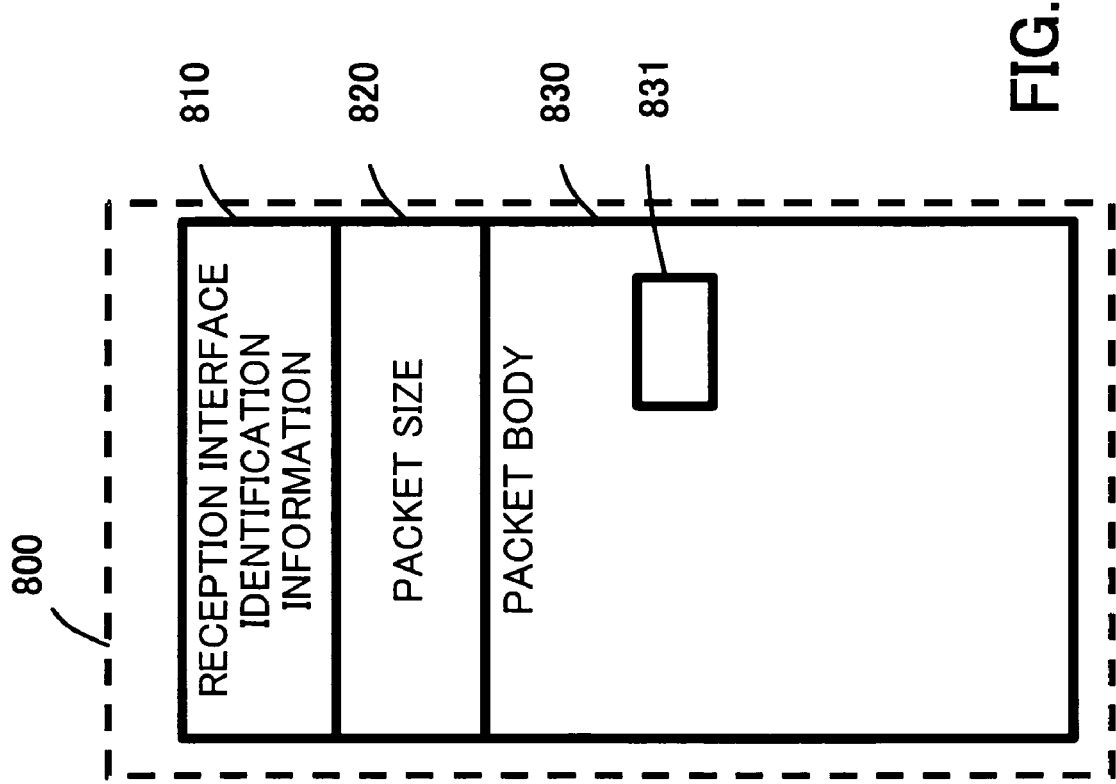

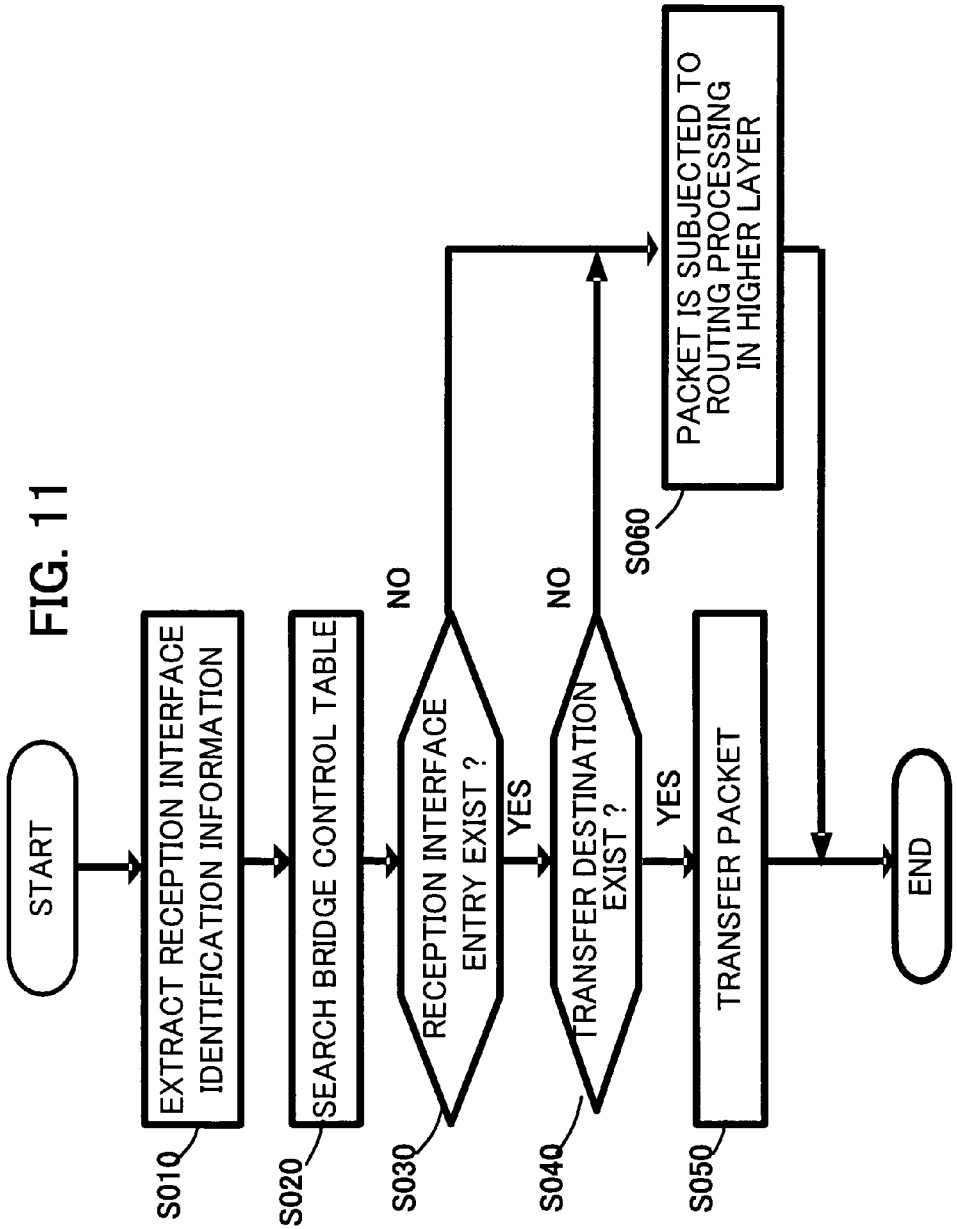

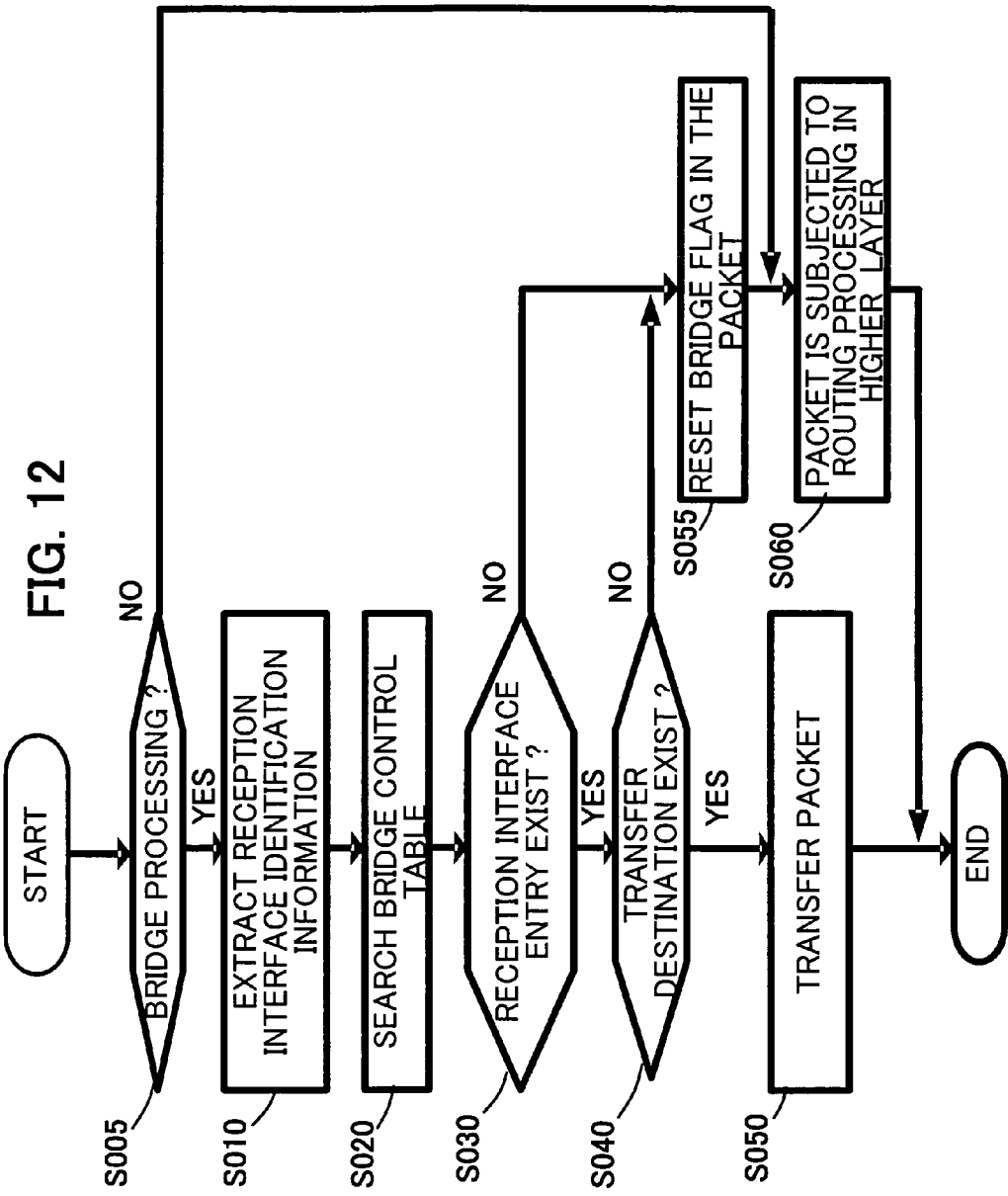

PACKET TRANSFER METHOD AND PACKET TRANSFER NODE

BACKGROUND OF THE INVENTION

1. Field of the Invention

The present invention relates to packet transfer technologies on networks, and more particularly, to a packet transfer method in which a network is divided into a plurality of network areas and routing within an individual network area and between network areas is performed.

2. Description of the Related Art

In recent years, significant increases in the capacity and bandwidth of communication networks typified by the Internet have been made. Thus, the number of communication apparatuses (Network Elements (NEs)) constituting networks and serving as backbones of such communication networks has been increased, and such communication apparatuses have become complicated.

In general, such a communication apparatus (hereinafter, referred to as a "node"), which is connected to a network for transmitting a user traffic, is also connected to a monitoring network which transmits packets for monitoring the communication apparatus (node). In this case, the node is often controlled using an OSI network on which routing processing can be performed in accordance with the ISO9542 and ISO10589 standards (hereinafter, referred to as OSI protocols) defined by International Organization for Standardization (ISO).

The OSI network adopts a method for dividing the entire network (domain) into a plurality of network areas and managing the plurality of network areas. On the OSI network, packet transfer processing, that is, routing within an individual network area and routing between network areas, is performed individually. Routing within an individual network area is called Level 1 (L1) routing, and routing between network areas is called Level 2 (L2) routing.

FIG. 1 shows the concept of a domain and an network area on an OSI network by way of example.

In FIG. 1, nodes represented by "IS1" are packet transfer nodes having an L1-routing function, and nodes represented by "IS1IS2" are packet transfer nodes having both the L1-routing function and L2-routing function. Nodes represented by "ES" are nodes not having a routing function.

In the example shown in FIG. 1, a domain 3 is divided into a network area 1 and a network area 2.

In the network area 1, ES nodes 141 and 142 and an IS1 node 140 communicate with each other on the basis of ES-IS protocol (ISO 9542), IS1 nodes 130 and 140 are L1-connected with each other, and an IS1IS2 node 110 and an IS1 node 120 are L1-connected with each other. An ES node 121 communicate with the IS1 node 120 on the basis of ES-IS protocol (ISO 9542).

In the network area 2, an IS1IS2 node 210, an IS1 node 220, and an IS1IS2 node 230 are L1-connected with each other, and an ES node 221 communicate with the IS1 node 220 on the basis of ES-IS protocol (ISO 9542).

In addition, the IS1IS2 node 110 in the network area 1 and the IS1IS2 nodes 210 and 230 in the network area 2 are L2-connected with each other (that is, a connection line performing L2 routing is formed). That is, the IS1IS2 nodes within the same network area are L1-connected and L-2 connected with each other.

In accordance with the convention of the OSI protocol, a packet transfer node that performs packet transfer within a network area, that is, an IS1 node having an L1-routing function, is required to hold routing information of all the nodes existing within the network area to which the packet transfer node belongs as the routing information table in a memory of the packet transfer node. Thus, when a node is added to a network area, the addition of the node affects the system resources, such as memory resource, address resources and processing performance resources, of all the packet transfer nodes within the network area. Especially in the case that a node includes both functions of transmitting a user traffic and transmitting a monitoring traffic, for example packets transmitted on the OSI network, the system resources of the node tend to be assigned firstly for the processing of the user traffic and the system resources assigned for the processing of the monitoring traffic are often restricted.

For example, when nodes are added to a network area, the number of nodes to be added is limited to a range not exceeding the number of nodes a packet transfer node having the least memory resource in the network area can handle (for example, the upper limit of the number of nodes on a network can be set to 300). This is because if more nodes than the limited number of nodes are added, the memory resource of the packet transfer node having the least memory resource in the network area becomes insufficient, and the operation of the entire network including the packet transfer node cannot be ensured.

Also, since a node on a network is uniquely identified by a network service access point (NSAP) address and is managed using the NSAP address in accordance with the convention of the OSI protocol, the number of NSAP addresses included within a network area can be limited.

Similarly, since a node performing L2 routing is required to have routing information of all the network nodes that perform L2 routing, the number of nodes (or the number of NSAP addresses) having the L2 protocol can be limited (for example, the upper limit of the number of nodes on a network is set to 250). The IS1IS2 nodes having the L1-routing function and the L2-routing function on the OSI network shown in FIG. 1 are required to hold information on both the L1 routing and L2 routing in the routing information table.

Generally, the number of connected nodes continues to increase in accordance with the continued operation of a network. Thus, as shown by the example of the OSI network, the limit of the number of nodes that can be provided in a network area or a domain is an important issue for network architecture.

As a technology for adding a node onto an OSI network, a technology for adding a node without consuming an NSAP address and for performing routing is disclosed in Japanese Unexamined Patent Application Publication No. 2005-277893.

In known technologies, when a new node is added so as to be adjacent to a network area on a network for which area management is performed, if the network area does not have a memory resource sufficient for adding the node, it is necessary to divide the network area into a plurality of network areas and to cause the new node to be accommodated in one of the divided network areas. Thus, the number of network areas constituting the entire network increases, and managing the entire network becomes complicated.

SUMMARY OF THE INVENTION

The present invention provides a packet transfer processing composed of a higher layer and a lower layer in a packet transfer node having a routing function, wherein one of the higher layer and the lower layer is selectively performed in accordance with setting of each packet transfer node.

A packet transfer method according to an aspect of the present invention for performing packet transfer among nodes on a network includes transmitting a data packet, according to hierarchical packet processing layers composed of a higher layer and a lower layer in a packet transfer node having a routing function to transfer a packet within a network area and/or between network areas of nodes, selecting one of the higher layer and the lower layer for each packet to be transferred by the packet transfer node, and performing, by the packet transfer node, the packet transfer by the selected hierarchical layer.

Thus, selection between packet transfer in the higher layer and packet transfer in the lower layer can be performed in accordance with setting of each of the packet transfer nodes. Thus, packet transfer in the lower layer can be performed in parallel with packet transfer in the higher layer without affecting the packet transfer in the higher layer.

In the higher layer, the network may be divided into one or more network areas, and routing processing within an individual network area and between network areas may be performed.

In the lower layer, bridge processing in which a packet is transferred to a communication link between the packet transfer nodes without going through the routing processing in the higher layer can be performed.

Thus, in particular, on a network, which is divided into a plurality of network areas and in which routing processing within an individual network area and between network areas is performed, such as an OSI network, when a node is added, a packet transfer node in a network area that is adjacent to the added node transfers a packet by bridge processing. Thus, packets originating from the added node can be processed by a network area that is not adjacent to the added node and the added node is deemed to be a packet transfer node in the network area. Therefore, network expansion can be achieved while suppressing an increase in the number of network areas.

BRIEF DESCRIPTION OF THE DRAWINGS

FIG. 10 shows an example of the structure of packet data according to the second embodiments of the present invention;

FIG. 11 is a flowchart showing bridge processing according to the first embodiment of the present invention; and FIG. 12 is a flowchart showing bridge processing according to the second embodiment of the present invention.

DESCRIPTION OF THE PREFERRED EMBODIMENTS

Figure 1:
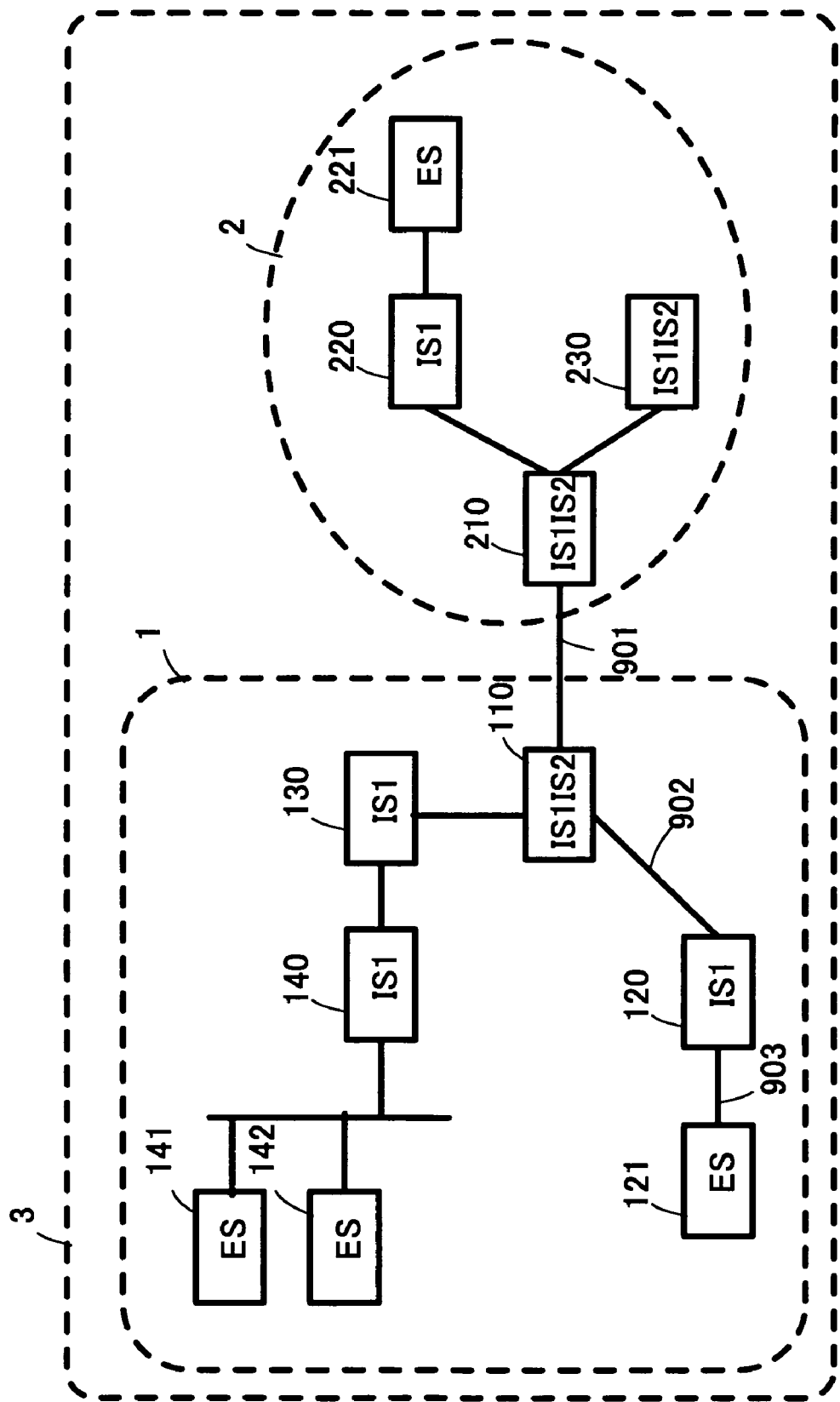
FIG. 1 shows the concept of a domain and a network area on an OSI network by way of example.
Figure 2:
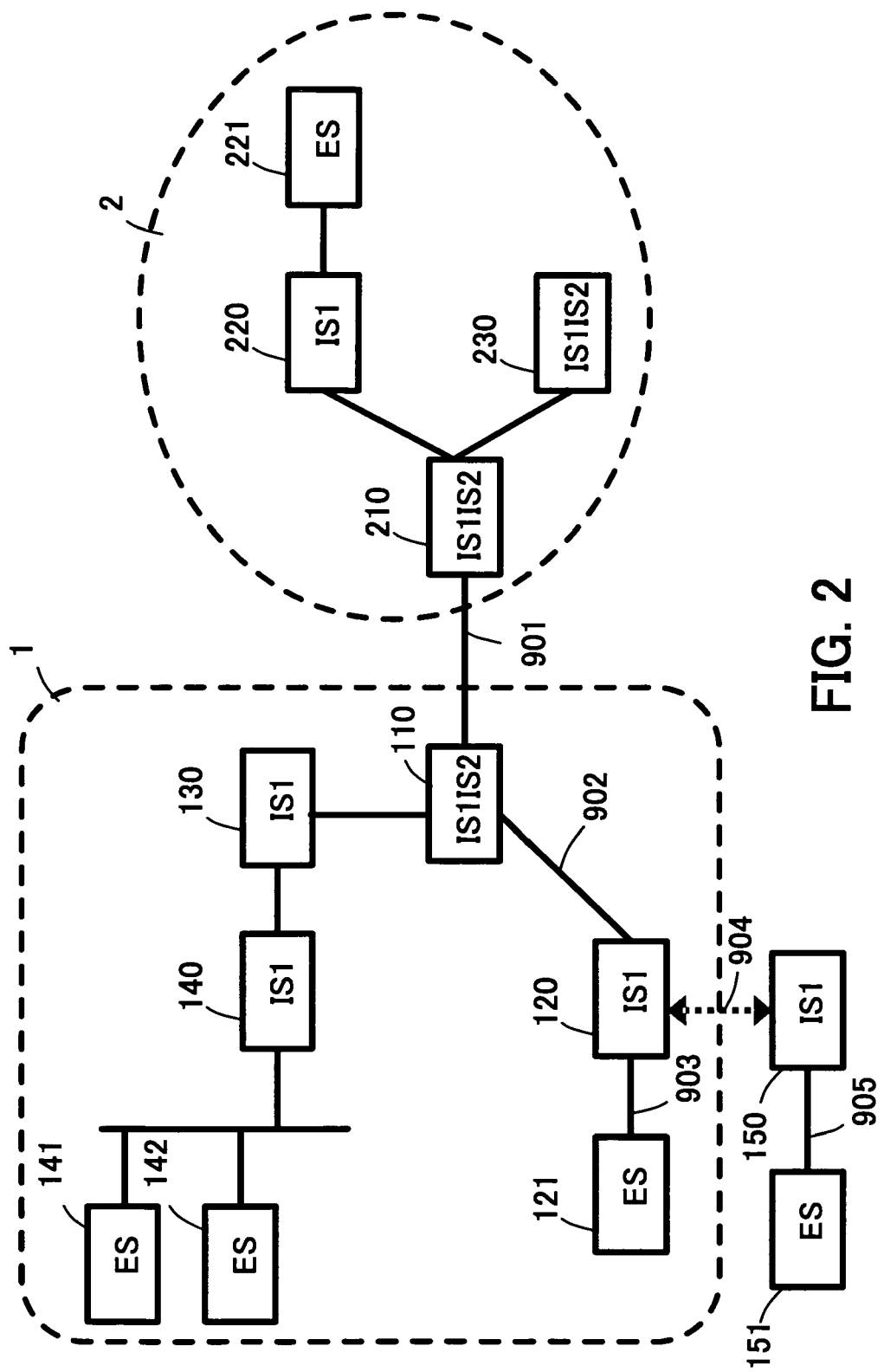
FIG. 2 shows a case where a node is added onto the OSI network by way of example.

FIG. 2 shows an example of a case where a node is added onto the OSI network shown in FIG. 1 by way of example.

In the example shown in FIG. 2, a packet transfer node 150 (IS1 node) located adjacent to the network area 1 and a node 151 (ES node) connected to the packet transfer node 150 are added to the network area 1. Here, it is assumed that the upper limit of the memory resource of one of the packet transfer nodes in the network area 1 is reached and a packet transfer node in the network area 2 has a sufficient memory resource.

Since the packet transfer node 150 to be added is some distance from the network area 2, it is difficult to directly connect the packet transfer node 150 to the network area 2. Thus, normally, the packet transfer node 150 should be added by causing the packet transfer node 150 to belong to the network area 1. However, in the current situation, the network area 1 does not have a sufficient memory resource. Thus, conventionally, after the network area 1 is divided into a plurality of network areas so that the memory resource consumed by each packet transfer node in the divided network areas is reduced, and the packet transfer node 150 is added to one of the network areas obtained by dividing the network area 1.

Figure 3:
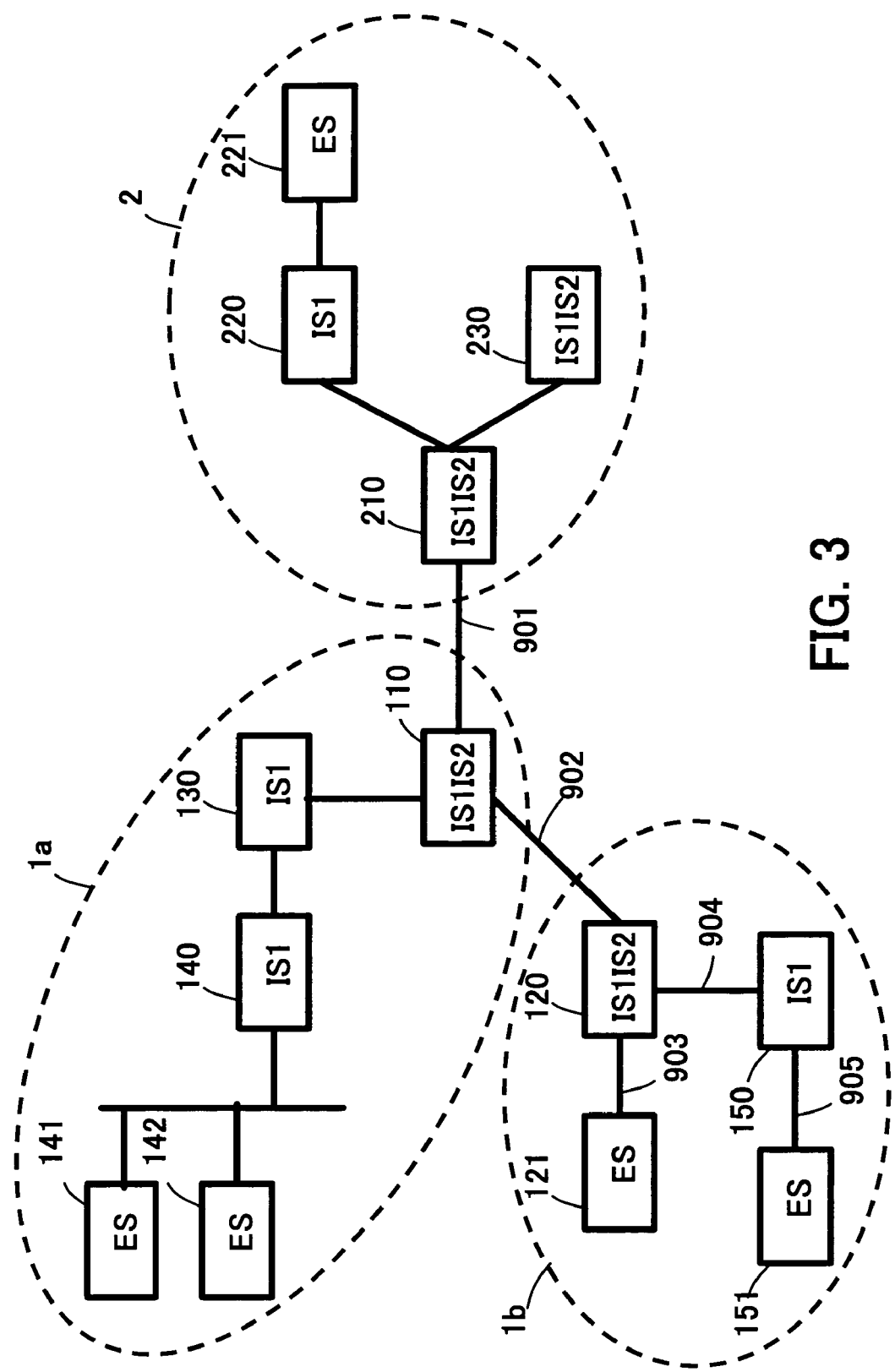
FIG. 3 shows a known method for adding a node onto the OSI network by way of example.

FIG. 3 shows an example of a known method for adding a node onto the OSI network shown in FIG. 2.

In the example shown in FIG. 3, since a packet transfer node whose memory resource is insufficient exists in the network area 1 that is adjacent to the packet transfer node 150 to be added, the network area 1 is divided into network areas 1a and 1b, and the nodes 150 and 151 are accommodated within the network area 1b that is obtained by dividing the network area 1. That is, the existing nodes 120 and 121 shown in FIG. 2 and the nodes 150 and 151 form the network area 1b in FIG. 3

Thus, conventionally, in order to realize addition of the nodes 150 and 151 as described above, it is necessary to perform routing between the network areas 1a and 1b. In addition, it is necessary to change the existing packet transfer node 120 (the IS1 node that performs only L1 routing) into an IS1IS2 node that is capable of performing routing between network areas (L2 routing). That is, another IS1IS2 node that performs L1 routing and L2 routing is added by dividing the network area 1 into the network areas 1a and 1b.

Generally, a disadvantage of the known method is that since network architecture over a plurality of network areas is provided with an L2-routing function, managing the network architecture over a plurality of network areas is more complicated, requires a higher-level management system, and performs a more complicated network operation, compared with managing network architecture within a single network area.

Figure 4:
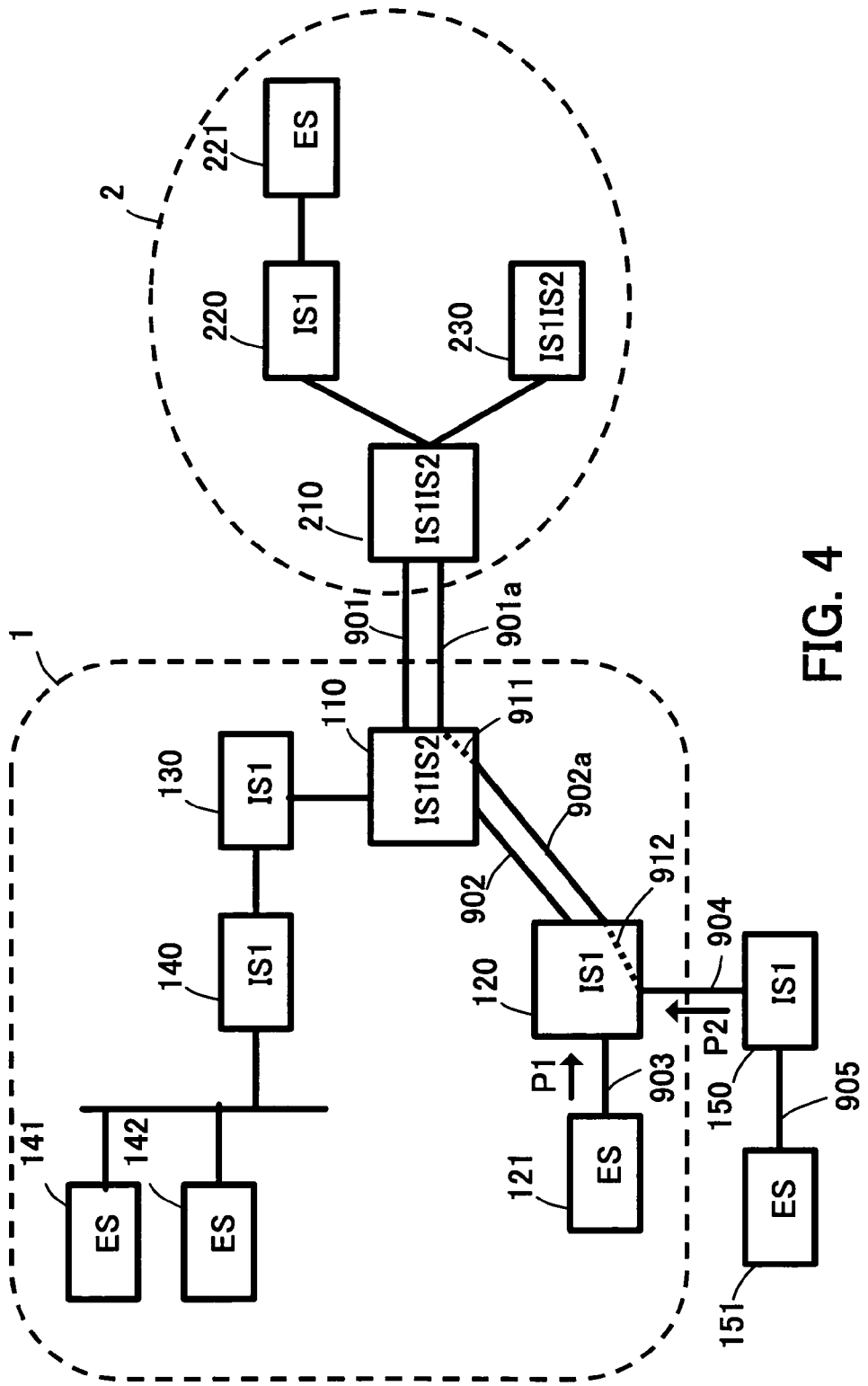
FIG. 4 shows a method according to a first embodiment of the present invention for adding a node.

FIG. 4 shows an example of node addition according to a first embodiment of the present invention.

In this example, although a node cannot be added to the network area 1 that is adjacent to the packet transfer node 150 to be added, since, for example, the network area 1 includes a packet transfer node whose system resources (such as a memory resource or other resources) are insufficient, the network area 2 that is not adjacent to the packet transfer node 150, has system resources sufficient for adding the node, as in the example of the OSI network shown in FIG. 2.

In the first embodiment, by connecting the packet transfer node 150 to the packet transfer node 120 (IS1 node) in the network area 1 that is adjacent to the packet transfer node 150, the packet transfer node 150 is deemed to belong to the network area 2 that is not adjacent to the packet transfer node 150 and without dividing the network area 1. In the first embodiment, however, for allowing separation from a packet flow based on the known L1 routing or L2 routing, communication links 901a and 902a are provided in parallel with the existing corresponding communication link 901 between the packet transfer nodes 210 and 110 and the existing corresponding communication link 902 between the packet transfer nodes 110 and 120.

Here, the first embodiment of the present invention is applied to the packet transfer nodes 110 and 120 in the network area 1 and the packet transfer node 210 in the network area 2, if the packet transfer node 150 is to be added. The packet transfer nodes according to the first embodiment of the present invention, divide packet transfer processing into a higher layer and a lower layer, and a received packet can be selectively processed in the higher layer or the lower layer in accordance with bridge/routing processing setting of each of packet transfer nodes 120, 110. For example, on the OSI network, in the packet transfer processing on the higher layer, the known L1 or L2 routing is performed. In addition, in the packet transfer processing on the lower layer or bridge layer, a packet is switched on the basis of a low layer address such as a MAC (Media Access Control) address between the communication links 904 and 902a in the packet transfer node 120, and between the communication links 902a and 901a in the packet transfer node 110, in accordance with setting information set in advance for each node, without performing the routing processing on the higher layer. The bridge layer transfers a packet among the packet transfer nodes, without relation to defined network areas, or without affecting the routing processing of the packet transfer nodes in the defined network areas. Taking the above-mentioned points into consideration, in the following descriptions, packet transfer processing on the higher layer is represented by "routing processing", and packet transfer processing on the lower layer is represented by "bridge processing".

In FIG. 4, a packet P2 transmitted from the packet transfer node 150 is received at the packet transfer node 120 via the communication link 904. The packet transfer node 120 transfers to the packet transfer node 110 (the IS1IS2 node) via the newly established communication link 902a the packet P2 received from the packet transfer node 150. The packet transfer node 110 transfers to the packet transfer node 210 (the IS1IS2 node) via the newly established communication link 901a the packet P2 received via the communication link 902a. The packet transfer from the packet transfer node 150 to the packet transfer node 210 is performed by packet transfer processing on the lower layer of each of the packet transfer nodes 120, 110, that is, bridge processing at these packet transfer nodes 120, 110 with routing functions in the network area 1. The bridge processing is performed independent of packet transfer processing on the higher layer in which the known L1 or L2 routing, that is, the routing processing, is performed by nodes 120, 110. Thus, the bridge processing is performed without affecting the known packet transfer (for example, the L1 or L2 routing) performed in the network area 1.

The packet transfer node 210 causes the packet received as described above via the communication link 901a to be subjected to the routing processing on the higher layer. Thus, the packet is subjected to routing processing (for example, L1 or L2 routing) in the network area 2, and each node in the network area 2 is capable of dealing with the packet from the packet transfer node 150 as a packet that is equivalent to a packet from a node accommodated within the network area 2.

Similarly, packet transfer from the packet transfer node 210 to the packet transfer node 150 is performed in accordance with a packet flow in a direction that is opposite from the direction of the packet flow from the packet transfer node 150 to the packet transfer node 210.

As described above, according to the first embodiment of the present invention, the packet transfer node 150 can be added, adjacent to the network area 1 whose memory resource is insufficient, to a network as a node belonging to the network area 2 without dividing the network area 1.

Figure 5:
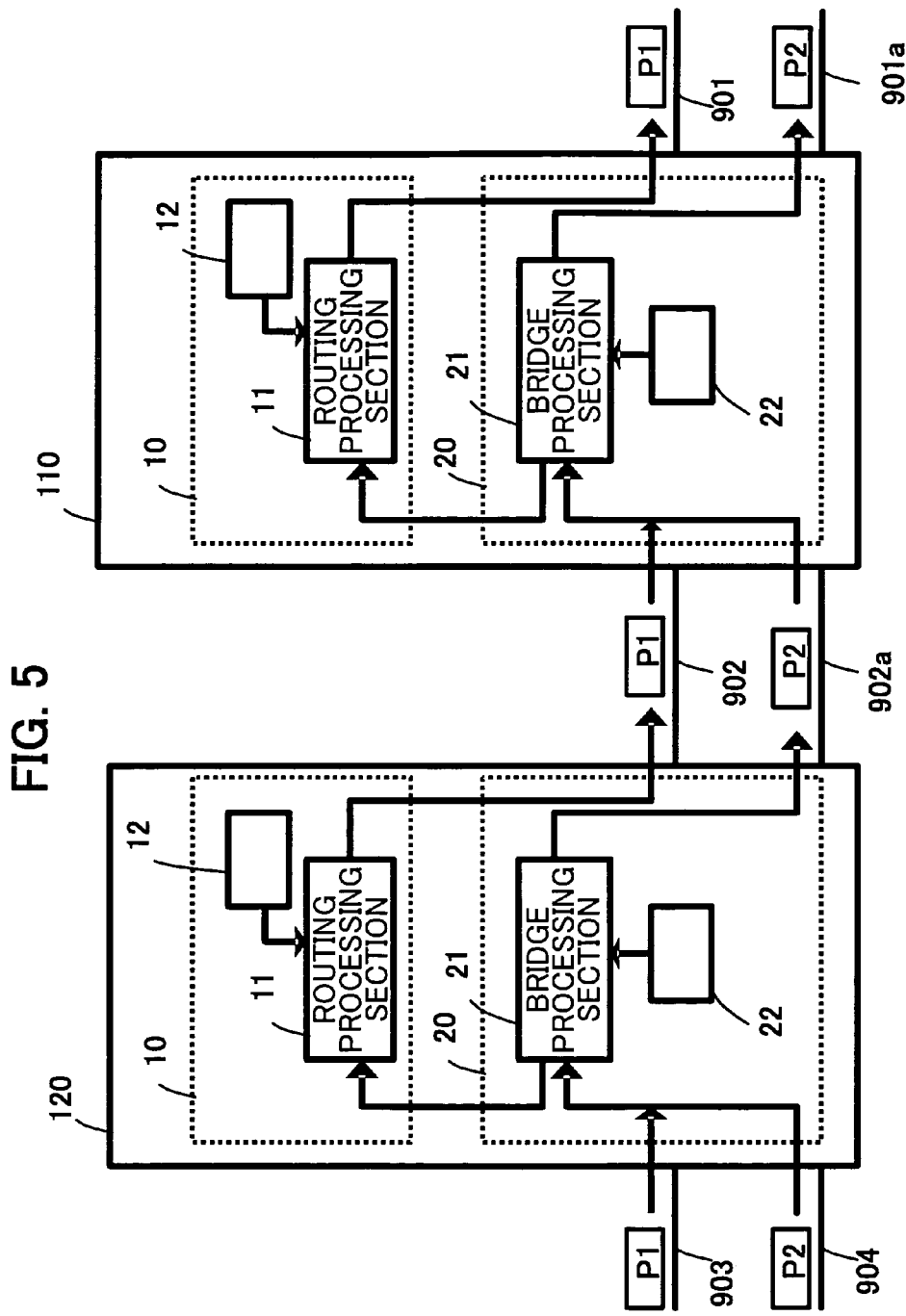
FIG. 5 shows the functions of the first embodiment.

FIG. 5 shows the functions of the first embodiment of the present invention for adding a node, by way of an example of the packet transfer nodes 120 and 110 within the network area 1 on the OSI network shown in FIG. 4.

The packet transfer node 120 receives a packet P1 via the communication link 903 between the packet transfer node 120 and the ES node 121. In addition, the packet transfer node 120 receives a packet P2 from the packet transfer node 150 via the communication link 904.

Figure 9A:
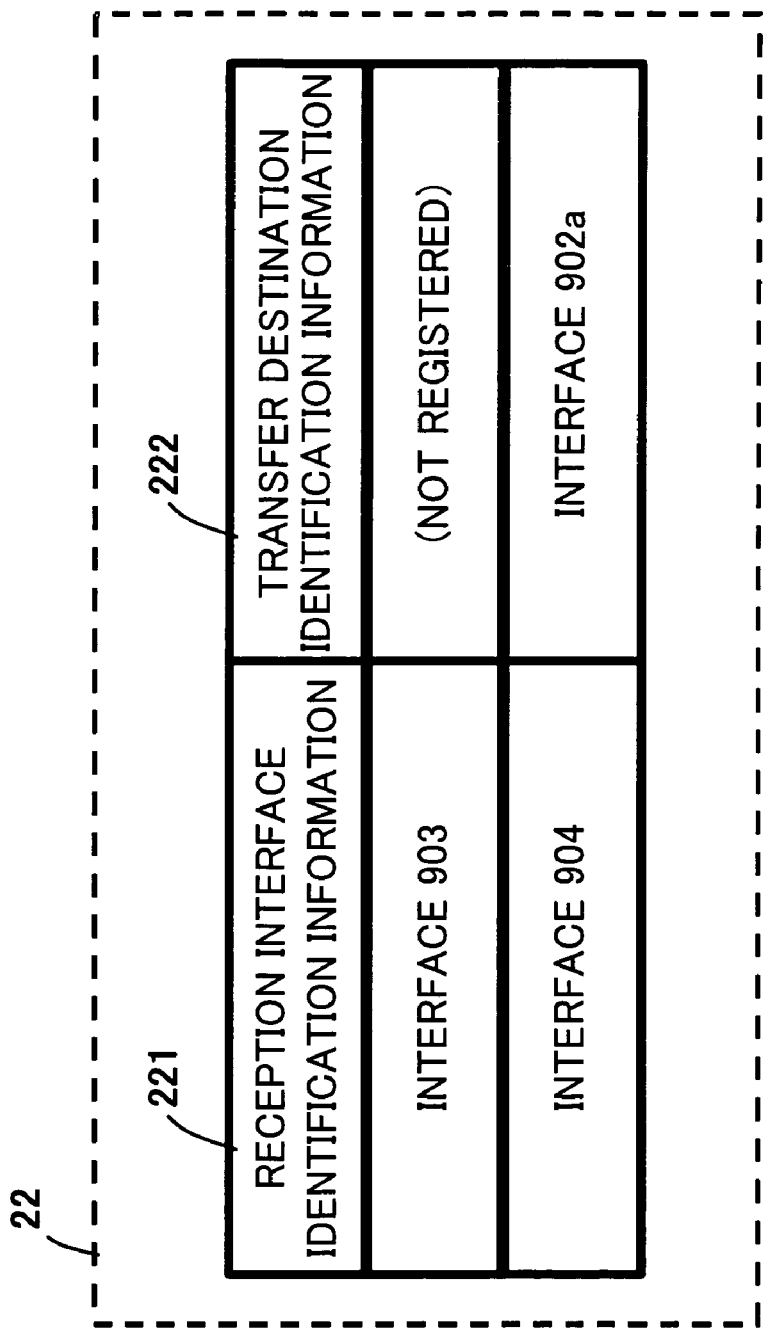
FIGS. 9A-9D each shows an example of the structure of a bridge control table according to the embodiments of the present invention.

The received packets P1 and P2 are processed by a bridge processing section 21 in the lower layer in accordance with information set in advance in a bridge control table 22 to determine whether the packets read to be bridge processed or routing processed. As shown in FIG. 9A, reception interface identification information on a packet and transfer destination interface identification information corresponding to the reception interface identification information are set in the bridge control table 22 provided, for example, in the packet transfer node 120. A packet P1 received from an interface indicated by reception interface identification information (interface 903 in FIG. 9A) whose corresponding transfer destination interface identification information is not set is regarded as not being a target of processing of the bridge processing section 21, and is delivered to the routing processing section 11 in the higher layer. Then, L1 routing that is similar to known packet transfer processing is performed in accordance with information stored in the known L1 routing table 12. A packet received from an interface indicated by reception interface identification information that is not set in the bridge control table 22 is also delivered to the routing processing section 11 in the higher layer.

In contrast, a packet received from a reception interface (interface 904 in FIG. 9A) whose corresponding transfer destination interface identification information is set in the bridge control table 22 of the packet transfer node 120, is transferred to a communication link indicated by the transfer destination interface identification information (interface 902a in FIG. 9A) set in the bridge control table 22.

In the example shown in FIG. 5, the bridge control table 22 is set, for example, in advance as described below.

Since the packet P1 received via the communication link 903 is a packet received from the node 121 within the network area 1, transfer destination interface identification information for reception interface identification information corresponding to the communication link 903 is not set or an entry of the reception interface identification information corresponding to the communication link 903 is not registered in the bridge control table 22, as shown in FIG. 9A.

In contrast, since the packet P2 received via the communication link 904 is a packet received from the packet transfer node 150, transfer destination interface identification information for reception interface identification information corresponding to the communication link 904 is set in the bridge control table 22 so as to indicate the communication link 902a, as shown in FIG. 9A.

In accordance with the bridge control table 22 set as described above, the packet P1 received from the node 121 belonging to the network area 1 is processed by the routing processing section 11 in the higher layer in accordance with a known procedure, and is transferred to the existing communication link 902. In contrast, the packet P2 received from the packet transfer node 150 is processed by the bridge processing section 21 in the lower layer provided in the first embodiment of the present invention, and is transferred to the communication link 902a provided for bridge processing, without being processed by the routing processing section 11 in the higher layer.

Packet transfer processing of the packet transfer node 110 is performed, as in the processing of the packet transfer node 120. In the example shown in FIG. 5, since the packet transfer node 120 is an IS1 node, the routing processing section 11 in the higher layer performs L1 routing. However, since the packet transfer node 110 is an IS1IS2 node, the routing processing section 11 in the higher layer performs L1 routing and L2 routing. The difference between the processing of the packet transfer node 120 and the processing of the packet transfer node 110 does not affect the principle of the present invention. In addition, since the contents of the routing information table 12 and the bridge control table 22 are individually settable for each packet transfer node, the set contents of the packet transfer node 110 are different from the set contents of the packet transfer node 120.

Figure 9B:
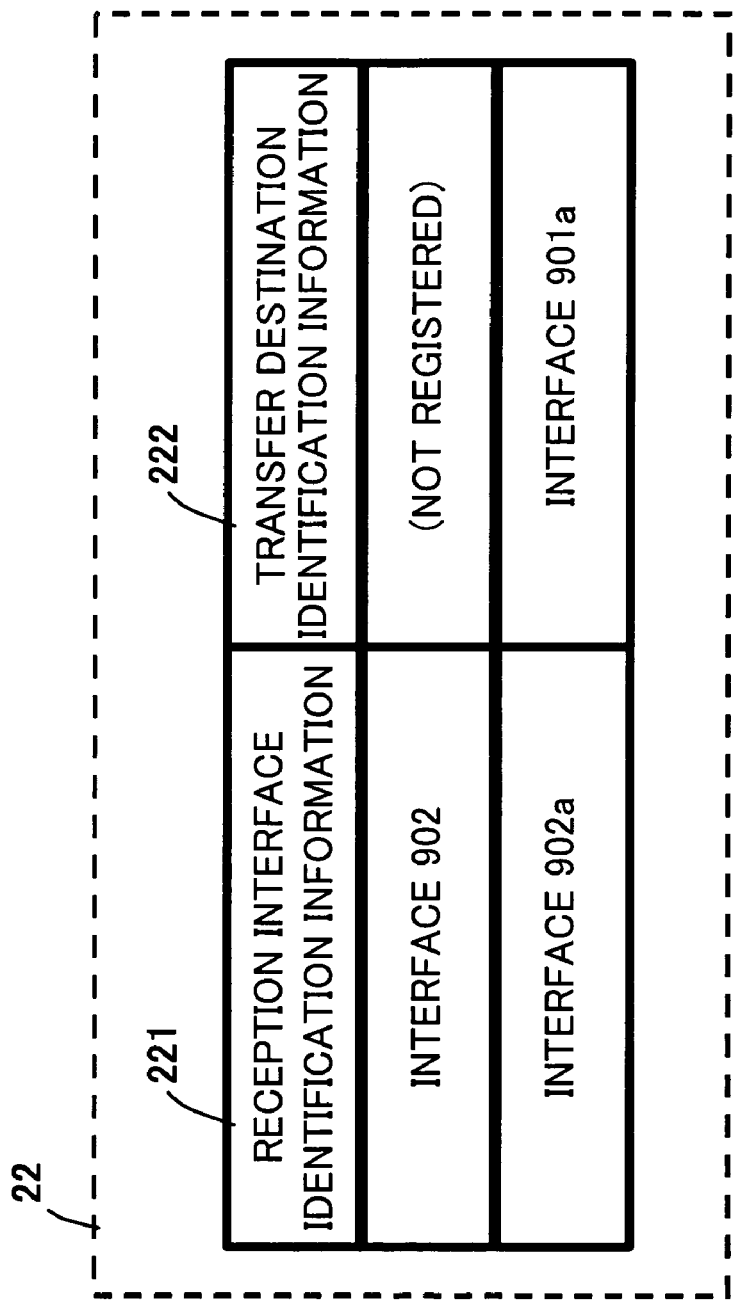

The packet P1 received via the communication link 902 between the packet transfer node 120 and the packet transfer node 110 and the packet P2 received via the communication link 902a are processed by the bridge processing section 21 in the lower layer in accordance with information set in advance in the bridge control table 22 of the packet transfer node 110. Reception interface identification information and transfer destination interface identification information corresponding to the reception interface identification information are set in the bridge control table 22 of the packet transfer node 110, as shown in FIG. 9B. If a packet is received from an interface indicated by reception interface identification information (interface 902 in FIG. 9B) whose corresponding transfer destination interface identification information is not set, the packet is regarded as not being a target of processing of the bridge processing section 21 in the lower layer. Thus, the packet is delivered to the routing processing section 11 in the higher layer, and L1 routing or L2 routing, which is similar to known packet transfer processing, is performed in accordance with information stored in the routing information table 12. If a packet is received via a communication link indicated by reception interface identification information that is not set in the bridge control table 22, the packet is also delivered to the routing processing section 11 in the higher layer.

In contrast, if a packet is received from a reception interface (interface 902a in FIG. 9B) whose corresponding transfer destination interface identification information is set in the bridge control table 22, the packet is transferred to a communication link indicated by the transfer destination interface identification information (interface 901a in FIG. 9B) set in the bridge control table 22.

In the example shown in FIG. 5, transfer destination interface identification information for reception interface identification information corresponding to the communication link 902 is not set or an entry of the reception interface identification information corresponding to the communication link 902 is not registered in the bridge control table 22. In contrast, transfer destination interface identification information for reception interface identification information corresponding to the communication link 902a is set so as to indicate an interface corresponding to the communication link 901a.

In accordance with the bridge control table 22 of the packet transfer node 120 set as described above, the packet P1 received at the node 110 from the node 121 belonging to the network area 1 is processed by the routing processing section 11 in the higher layer in accordance with a known procedure, as in the processing of the packet transfer node 120, and L1 routing and L2 routing are performed in accordance with the contents of the routing information table 12. Then, the packet P1 is transferred to the existing communication link 901. In contrast, the packet P2 received at the node 110 from the packet transfer node 150 is processed by the bridge processing section 21 in the lower layer provided in the first embodiment of the present invention, and is transferred to the communication link 901a provided for bridge processing, as in the processing of the packet transfer node 120.

Although not shown in FIG. 5, the packet transfer node 210 in the network area 2 in the first embodiment of the present invention causes the packet received via the communication link 901a, that is, the packet from the packet transfer node 150, to be subjected to routing processing in the higher layer. This is realized by not setting transfer destination interface identification information corresponding to reception interface identification information of the communication link 901a in the bridge control table 22 of the packet transfer node 210.

As described above, packet transfer of the packet P2 via the communication links 904, 902a, and 901a is performed independent of L1 or L2 routing performed by the packet transfer nodes 120 and 110 in the higher layer. Thus, the packet P2 can be transferred to the network area 2 without affecting routing processing of each of packet transfer nodes in the network area 1, and is subjected to the routing processing in the higher layer, that is, L1 routing or L2 routing, by the packet transfer node 210 located at the beginning of the network area 2. Accordingly, the routing processing is performed as processing in the network area 2.

As described above, the nodes 120 and 110 in the network area 1, the node 210 in the network area 2, and the node 150 are provided as packet transfer nodes according to the first embodiment of the present invention, and the contents of the bridge control table 22 used in the bridge processing section 21 in the lower layer of each of the packet transfer nodes are properly set. Thus, the packet P1 for which routing processing in the higher layer, which is known routing processing, is performed and the packet P2 for which bridge processing in the lower layer according to the first embodiment of the present invention is performed are capable of passing through the network area 1, independent of each other. That is, the packet P2 can be transferred between the added packet transfer node 150 and the packet transfer node 210 in the network area 2 that is adjacent to the network area 1 without affecting a known packet transfer flow in the network area 1, and routing processing similar to known routing processing can be performed on the packet transfer node 150 as a node belonging to the network area 2.

In the example shown in FIG. 5, the principle of the first embodiment of the present invention has been described by way of an example of packet transfer between two nodes. However, the number of nodes via which a packet is transferred is not limited.

In addition, the number of communication links is not limited to the number of communication links adopted in the above-described example.

Figure 6:
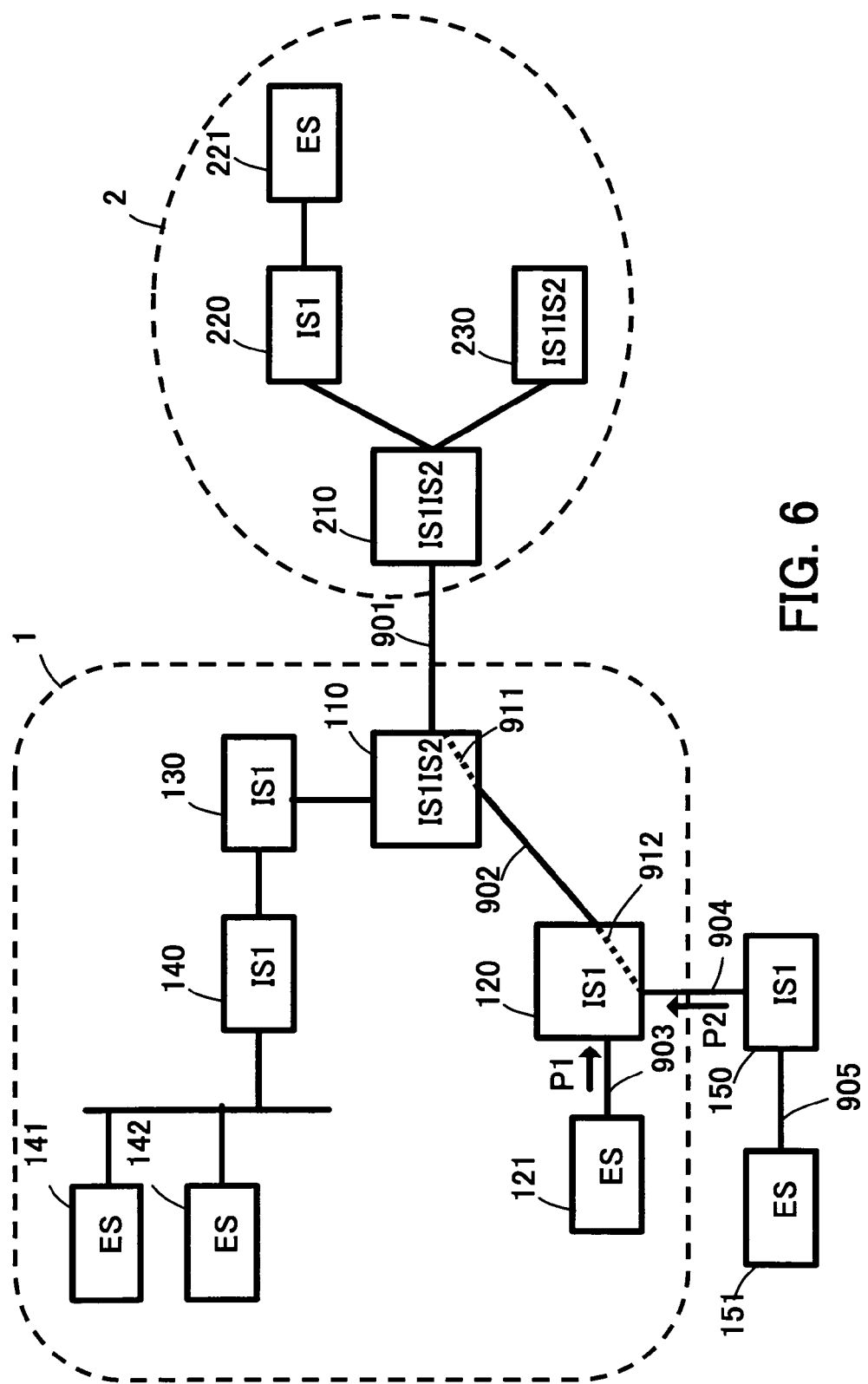
FIG. 6 shows a method according to a second embodiment of the present invention for adding a node.

FIG. 6 shows an example of node addition according to a second embodiment of the present invention.

In this example, although a node cannot be added to the network area 1 that is adjacent to the packet transfer node 150 to be added, since, for example, a packet transfer node whose memory resource is insufficient exists in the network area 1, the network area 2 that is not adjacent to the packet transfer node 150 has a sufficient memory resource, similarly to the node addition according to the first embodiment shown in FIG. 4.

In the packet transfer method according to the second embodiment, by connecting the packet transfer node 150 to the packet transfer node 120 in the network area 1 that is adjacent to the packet transfer node 150, the packet transfer node 150 is deemed to belong to the network area 2 that is not adjacent to the packet transfer node 150, as in the first embodiment.

However, the packet transfer method according to the second embodiment is different from the packet transfer method according to the first embodiment in that it is not necessary to provide a communication link for bridge processing in the lower layer in the network area 1 and in that packet transfer between the packet transfer node 150 and the network area 2 is performed via the existing communication links 902 and 901.

A packet transmitted from the packet transfer node 150 is received at the packet transfer node 120 via the communication link 904, and the packet transfer node 120 transfers, via the existing communication link 902 by the bridge processing in the lower layer, the packet received from the packet transfer node 150. The packet transfer node 110 transfers the packet received via the communication link 902 to the packet transfer node 210 in the network area 2 via the existing communication link 901 by the bridge processing in the lower layer. The packet transfer from the packet transfer node 150 to the packet transfer node 210 is performed independent of the known routing processing performed in the higher layer in each of packet transfer nodes (that is, for example, L1 or L2 routing on the OSI network). That is, packet transfer between the packet transfer node 150 and the packet transfer node 210 is performed without affecting the known packet transfer performed in the higher layer in the network area 1.

The packet transfer node 210 in the network area 2 delivers the received packet to the higher layer. Thus, each node in the network area 2 is capable of dealing with the packet received from the packet transfer node 150 as a packet received from a node in the network area 2 without affecting packet transfer in the higher layer in the network area 1.

Figure 7:
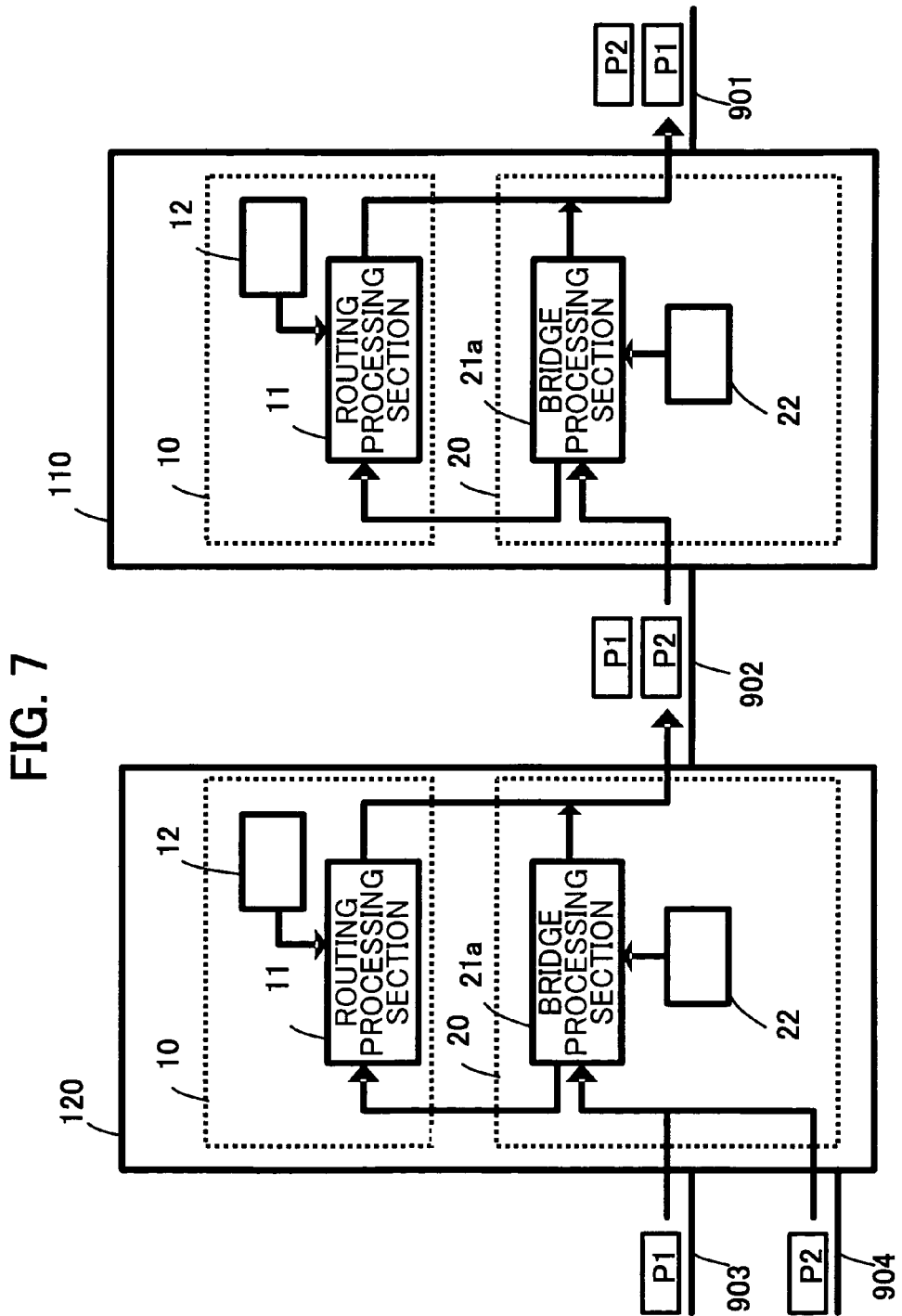
FIG. 7 is a functional block diagram of the second embodiment.

FIG. 7 shows an example in which the second embodiment of the present invention is applied to the packet transfer nodes 120 and 110 in the network area 1 shown in FIG. 6.

In the second embodiment, a bridge specification information is set in advance in a packet to be transferred. The bridge specification information can be, for example, flag information in the packet indicating whether the packet is a target of bridge processing. For example, if the bridge specification information indicates "ON", the packet is regarded as being a target of bridge processing. In contrast, if the bridge specification information indicates "OFF", the packet is regarded as not being a target of bridge processing.

In the example shown in FIG. 6, for example, the bridge specification information can be added by processing in the higher layer of the packet transfer node 150. Thus, each of the packet transfer nodes that relay the packet (in the example shown in FIG. 6, the packet transfer nodes 120, 110, and 210) is capable of determining whether the packet is a target of bridge processing. Thus, a packet that is to be subjected to bridge processing and a packet that is to be subjected to the known routing processing in the higher layer can be transmitted via the same communication link. Packets P1 and P2 received at the packet transfer node 120 are firstly processed in a bridge processing section 21a in the lower layer. The bridge processing section 21a determines the contents of the extracted bridge specification information. If the bridge specification information indicates "OFF", the packet is delivered to the routing processing section 11 in the higher layer.

If the bridge specification information indicates "ON", the bridge control table 22 is searched by the bridge processing section 21a.

Figure 9C:
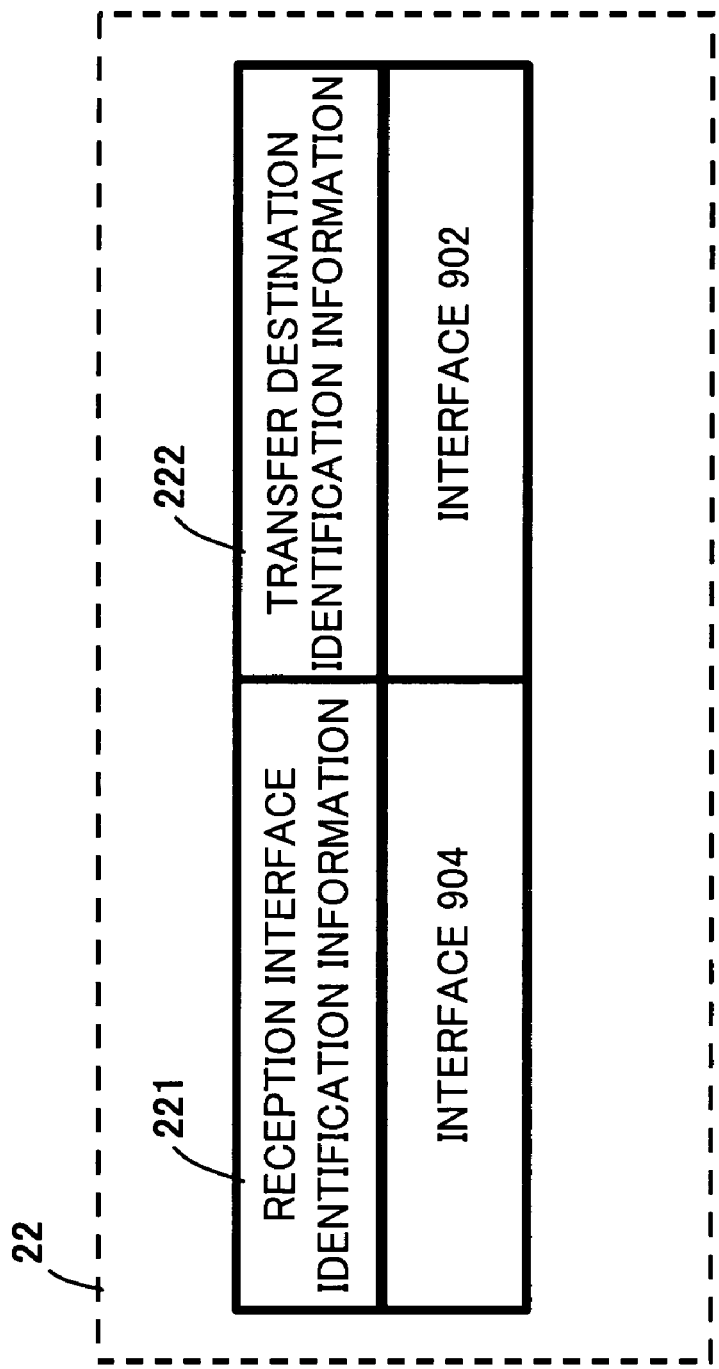

Reception interface identification information on a packet and transfer destination interface identification information corresponding to the reception interface identification information are set in the bridge control table 22, as shown in FIG. 9C. If a packet is received from an interface indicated by reception interface identification information whose corresponding transfer destination interface identification information is not set, the packet is regarded as not being a target of processing of the bridge processing section 21a in the lower layer and is delivered to the routing processing section 11 in the higher layer. If a packet is received from an interface indicated by reception interface identification information that is not set in the bridge control table 22, the packet is also delivered to the routing processing section 11 in the higher layer.

If a packet is received from an interface indicated by reception interface identification information (interface 904 in FIG. 9C) whose corresponding transfer destination interface identification information (interface 902 in FIG. 9C) is set, the packet is regarded as a target of processing of the bridge processing section 21a in the lower layer. Then, the packet is transferred to the communication link indicated by the corresponding transfer destination interface identification information (interface 902 in FIG. 9C), without performing the routing processing in the higher layer.

In the example of the network structure shown in FIG. 6, since the packet P1 received via the communication link 903 is a packet received from the node 121 within the network area 1, the bridge specification information in the packet P1 is reset or "OFF", so the packet P1 is regarded as not being a target of bridge processing. Therefore, the packet P1 is delivered to the routing processing section 11 in the higher layer, and is processed in accordance with the known procedure. Then, the packet P1 is transferred to the existing communication link 902.

If reception interface identification information (interface 903) whose corresponding transfer destination interface identification information is not set is registered in the bridge control table 22a the bridge control table 22, the packet P1 is regarded as not being a target of processing of the bridge processing section 21a in the lower layer and is delivered to the routing processing section 11 in the higher layer of the packet transfer node 120. In this case, the bridge specification information in the packet P1 can be any.

In contrast, since the packet P2 received via the communication link 904 is a packet received from the added packet transfer node 150, information indicating the existing communication link 902 is set in the bridge control table 22 as transfer destination interface identification information (interface 902 in FIG. 9C) for reception interface identification information (interface 904 in FIG. 9C) corresponding to the communication link 904. Thus, since bridge specification information on the packet P2 received from the added packet transfer node 150 indicates "ON", bridge processing in the lower layer is performed on the packet P2 in accordance with the contents of the bridge control table 22, and is transferred to the communication link 902 without going through routing processing in the higher layer.

Figure 9D:
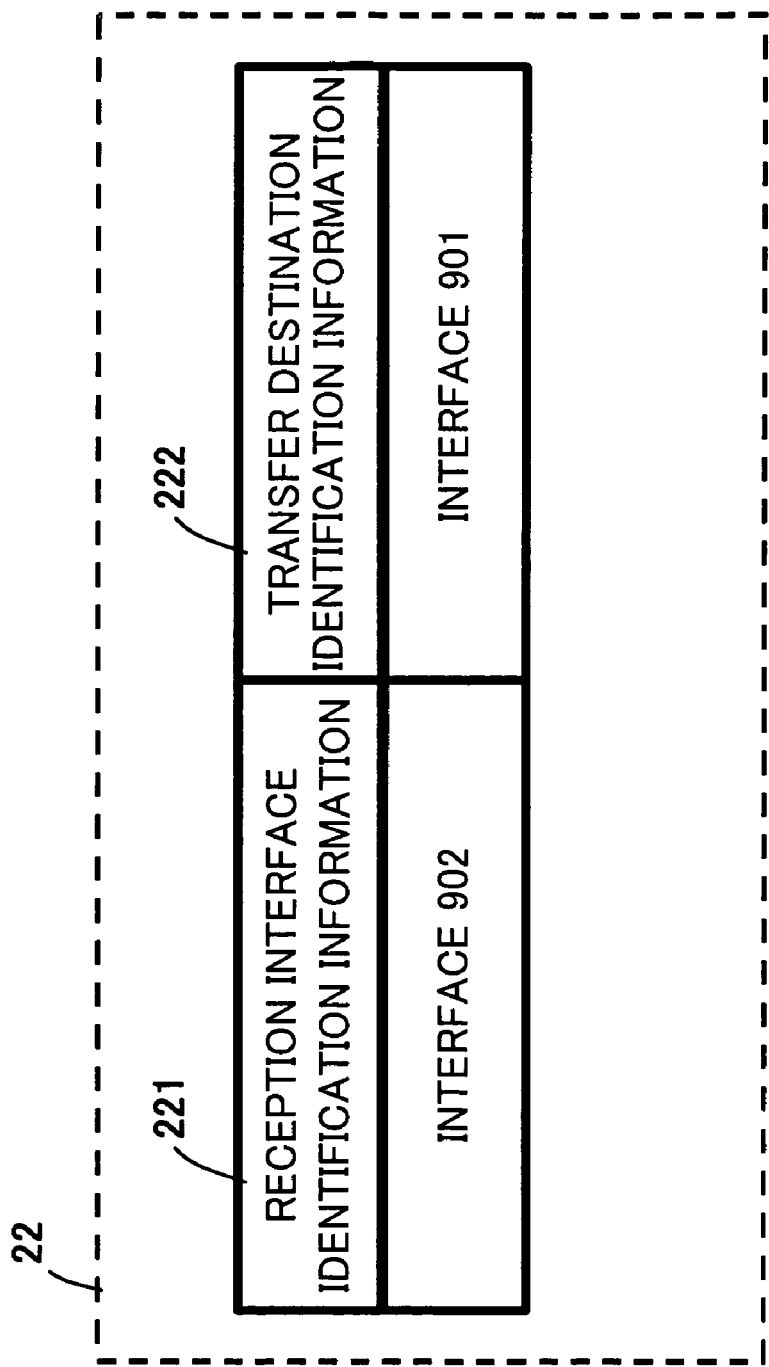

Then, the packet transfer node 110 receives the packets P1 and P2 via the existing communication link 902 from the packet transfer node 120. Then the bridge processing section 21 in the lower layer of the packet transfer node 110 searches the bridge control table 22, which is shown in FIG. 9D, for reception interface identification information of the communication link 902 and transfer destination interface identification information corresponding to the reception interface identification information. If the reception interface identification information and the transfer destination interface identification information corresponding to the reception interface identification information exist in the bridge control table 22, the bridge processing section 21 determines bridge specification information on each of the packet P1 and P2.

As described above, if the bridge specification information indicates "ON", the packet is transferred to a communication link indicated by the transfer destination interface identification information.

In contrast, if the bridge specification information indicates "OFF" (the bridge specification information is not set), the packet is delivered to the routing processing section 11 in the higher layer.

Thus, in the example shown in FIG. 7, the packet P2 whose bridge specification information indicates "ON" is subjected to bridge processing, and then transferred to the communication link 901. In contrast, the packet P1 whose bridge specification information is not set or has been reset to "OFF" is subjected to routing processing in the higher layer, and then transferred to the communication link 901.

Although not shown in FIG. 7, in the bridge control table 22 in the lower layer of the packet transfer node 210 in the network area 2, transfer destination interface identification information corresponding to reception interface identification information of the communication link 901 is not set. By this, a packet P2 received via the communication link 901 is reset by the node 210. In other words, the packet transfer node 210 resets (sets to "OFF") bridge specification information on the received packet P2, and then delivers the packet P2 to the higher layer. Thus, the packet P2 is handled as a target of routing processing in the higher layer in the network area 2, and the added packet transfer node 150 is processed as a node belonging to the network area 2.

As described above, packet transfer of the packet P2 via the communication links 904, 902, and 901 is performed by bridge processing in the lower layer, which is independent of L1/L2 routing performed on the packet P1 in the higher layer of the packet transfer nodes 120 and 110. Thus, the packet P2 is transferred to the network area 2 without affecting routing processing on the packet P1, which is performed by the higher layer, of each of the packet transfer nodes in the network area 1, and delivered to the higher layer of the packet transfer node 210, which is located at the beginning of the network area 2. Thus, packet transfer between the added packet transfer node 150 and the network area 2 can be performed via the network area 1 without affecting routing processing in the network area 1, and the added packet transfer node 150 can be processed as a node belonging to the network area 2.

In the example shown in FIG. 7, the function of the second embodiment of the present invention has been described by way of an example of packet transfer between two nodes. However, the number of nodes via which a packet is transferred is not limited.

In addition, the number of communication links is not limited to the number of communication links adopted in the second embodiment.

Figure 8:
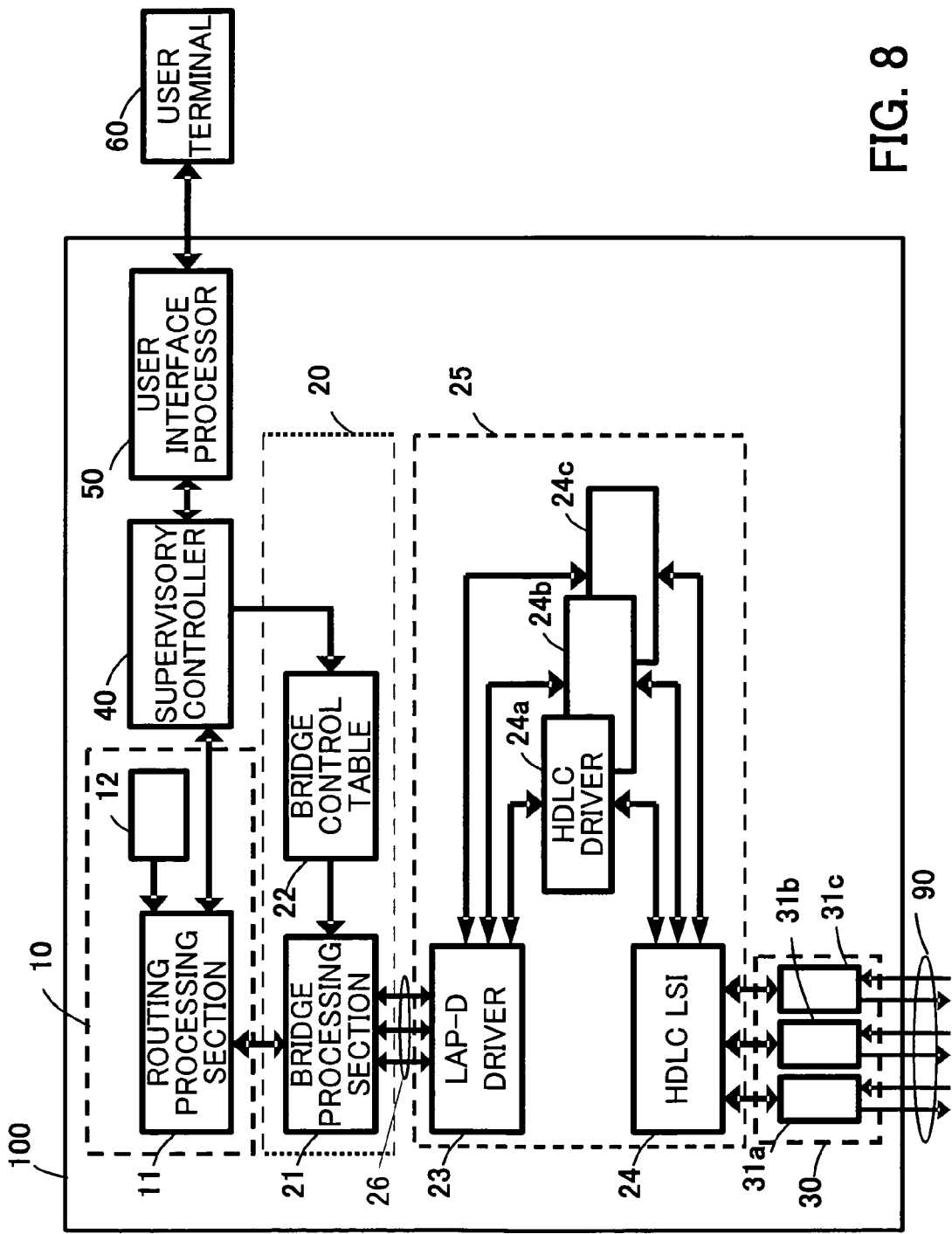
FIG. 8 shows an example of the structure of a packet transfer node according to the embodiments of the present invention.

FIG. 8 shows an example of the structure of a packet transfer node according to the embodiments of the present invention.

In this structural example, the higher layer 10 corresponds to a network layer of an OSI reference model, and the lower layer 20 corresponds to a data link layer of the OSI reference model in which the described processes of the present embodiment are implemented in software and/or computing hardware. An implementation example of a packet transfer node on an OSI network is shown in FIG. 8.

The routing processing section 11 is provided in the higher layer 10, and L1/L2 routing information is stored in the routing information table 12.

The bridge processing section 21 that performs packet transfer in accordance with information set in the bridge control table 22 without going through routing processing in the higher layer, according to the embodiment of the present invention, is provided in the lower layer 20.

The structural example in FIG. 8 shows a case where data transfer between nodes is performed in accordance with a Link Access Procedure for the D-channel (LAP-D) in a high-level data link control (HDLC) format. The structural example includes an HDLC LSI 24 that controls an HDLC procedure, a LAP-D driver 23 that controls the LAP-D, and HDLC drivers 24a, 24b, and 24c that perform HDCL control for line correspondence.

A supervisory controller 40 performs network management. The supervisory controller 40 receives, as command information, a supervisory control operation received from a user terminal 60 (personal computer (PC) or a workstation) provided with monitoring software, such as a simple network management protocol (SNMP) manager, via a user interface processor 50. Then, the supervisory controller 40 issues an instruction to the routing processing section 11 and performs setting for the bridge control table 22 in accordance with the contents of the command information.

Packet data sent from a connected node on the OSI network is terminated at a physical layer 30, for example, by optical input/output devices 31a, 31b, and 31c via an optical fiber 90 serving as a physical communication link, and packet data is extracted. Then, the packet data is delivered to the layer 25.

Then, original datagram is reconstructed by the HDLC LSI 24, the HDLC drivers 24a, 24b, and 24c, and the LAPD driver 23, and the reconstructed datagram is delivered to the bridge processing section 21 as a packet.

The bridge processing section 21 performs packet transfer in accordance with information set in the bridge control table 22. The packet processed by the bridge processing section 21 may or may not be delivered to the higher layer 10 depending on the information set in the bridge control table 22.

Identification information on an interface to which a packet is transferred (transfer destination interface identification information) is stored in association with identification information on an interface by which the packet is received (reception interface identification information) in the bridge control table 22, as shown in FIGS. 9A-9D. If transfer destination interface identification information is set in association with identification information on an interface by which the packet is received in the bridge control table 22, the packet received is switched to the data links 26 of FIG. 8, which correspond to communication links 90, respectively, without delivering the packet to the higher layer 10.

If transfer destination interface identification information is not set or if an entry of reception interface identification information of a communication link via which the packet is received is not registered, processing for the received packet is terminated by the processing in the lower layer 20. Then, the packet is delivered to the higher layer 10.

In addition, in the second embodiment, also if bridge specification information of a received packet is not set, or the bridge specification information of the packet is reset, the packet is delivered to the higher layer 10, and processed by the routing processing section 11.

Since as an example three interfaces for the OSI network are provided in the embodiments of the present invention, optical input/output devices 24a, 24b, and 24c and the HDLC drivers 24a, 24b, and 24c are provided so as to correspond to the three communication links 90. However, each of the HDLC LSI 24 and the LAPD driver 23 has a function to collectively process input/output data for the three interfaces.

In known apparatuses, LAPD driver data output from the LAPD driver 23 is directly input to the routing processing section 11 in the higher layer 10, and the data is processed in the routing processing section 11. For example, if the LAPD driver data relates to routing information on the OSI network, the LAPD driver data is properly processed in the routing processing section 11 and used for routing on the OSI network. If the LAPD driver data is user data to be delivered to a further higher layer, for example, the LAPD driver data is transferred to the supervisory controller 40 that performs processing in a higher layer.

In the above-mentioned embodiments, a case where three communication links 90 are provided for the bridge processing has been described, for the sake of explanation. However, the number of communication links 90 is not limited to this.

FIGS. 9A-9D show examples of the bridge control table 22.

FIG. 9A is the bridge control table 22 of the packet transfer node 120, and FIG. 9B is the bridge control table 22 of the packet transfer node 110, according to the first embodiment of the present invention.

FIG. 9C is the bridge control table 22 of the packet transfer node 120, and FIG. 9D is the bridge control table 22 of the packet transfer node 110, according to the second embodiment of the present invention.

In FIGS. 9A-9D, reception interface identification information 221 is information for identifying a physical communication link of a received packet, and transfer destination interface identification information 222 is identification information indicating an interface corresponding to a communication link that is a transfer destination of the packet received from the communication link indicated by the reception interface identification information. The reception interface identification information 221 and the transfer destination interface identification information 222 can be any information that can identify a communication link, such as a MAC address and a port number.

If the transfer destination interface identification information 222 is not set, bridge processing in the lower layer 20 is not performed, and the packet is delivered to the higher layer 10. If an entry of the reception interface identification information indicating the communication link via which a packet is received is not registered in the bridge control table 22, the received packet is also delivered to the higher layer 10.

In the setting example shown in FIG. 9A, which shows the bridge control table 22 of the node 120 in FIG. 5 according to the first embodiment, a packet P1 received via a communication link 903 whose reception interface identification information indicates an interface 903 is not bridge processed by the lower layer 20, and delivered to the higher layer 10. Then, for example, for the OSI network, L1/L2 routing is performed.

In contrast, a packet P2 received via the communication link 904 indicated as an interface 904 is transferred to the next transfer node 110 via the communication link 902a indicated as an interface 902a, by the lower layer 20, without being delivered to the higher layer 10. That is, bridge processing is performed on the packet.

FIG. 9B shows the setting example of the bridge control table 22 of the node 110 in FIG. 5, according to the first embodiment. A packet received via a communication link 902 whose reception interface identification information indicates an interface 902 in FIG. 9B, is not bridge processed by the lower layer 20, and delivered to the higher layer 10. Then, for example, for the OSI network, L1/L2 routing is performed. In contrast, a packet received via the communication link 902a indicated as an interface 902a in FIG. 9B, is transferred to the next transfer node 210 via the communication link 901a indicated as an interface 901a in FIG. 9B, by the lower layer 20, without being delivered to the higher layer 10. That is, bridge processing is performed on the packet.

In the second embodiment, if bridge specification information (a bridge flag) stored in a received packet is not set, the received packet is delivered to the higher layer 10 without referring to the bridge control table 22.

If bridge specification information (a bridge flag) stored in a received packet is set, and there is no destination information set in the bridge control table 22, the received packet is delivered to the higher layer 10. Otherwise, the bridge control table 22 is searched and the bridge processing is performed on the basis of the bridge control table 22.

In the setting example shown in FIG. 9C, which shows the bridge control table 22 of the node 120 in FIG. 7 according to the second embodiment, a packet P1 received via a communication link 903 is delivered to the higher layer 10 without referring to the bridge control table 22 because the bridge flag included in the received packet is reset. Then, for example, for the OSI network, L1/L2 routing is performed. In contrast, a packet P2 received via the communication link 904 indicated as an interface 904 in FIG. 9C, includes the bridge flag set at "ON" and the bridge control table 22 includes the corresponding entry with reception identification information of an interface 904. Therefore, the received packet is transferred to the next transfer node 110 via the communication link 902 indicated as an interface 902 in FIG. 9C, by the lower layer 20, without being delivered to the higher layer 10. That is, bridge processing is performed on the packet.

In the setting example shown in FIG. 9D, which shows the bridge control table 22 of the node 110 in FIG. 7 according to the second embodiment, if a bridge flag included in a packet received via a communication link 902 is reset, the received packet is delivered to the higher layer 10, without referring to the bridge control table 22 and, for example L1/L2 routing is performed. If the bridge flag included in the received packet is "ON", the bridge control table 22 (as shown in FIG. 9D) is referred to. The bridge control table 22 of FIG. 9D includes the corresponding entry with reception identification information of an interface 902 and the corresponding transfer destination identification information (interface 901 in FIG. 9D) is set. Therefore, the received packet is transferred to the next transfer node 210 via the communication link 901 indicated as an interface 901 in the bridge control table 22, by the lower layer 20, without being delivered to the higher layer 10. That is, bridge processing is performed on the packet.

As shown in FIGS. 9A-9D, it is understood that the size of the information set to the bridge control table 22, 22a is small and the information is set only to the nodes that perform the bridge processing. Therefore, the influence of the bridge control table 22, 22a on the memory resources of packet transfer nodes in the network is slight, compared with the influence of the routing table 12 on the memory resources of the packet transfer nodes.

A value different depending on the packet transfer node can be set in advance in the bridge control table 22 by various methods such as the supervisory controller 40 shown in the structural example in FIG. 8.

FIG. 10 shows an example of the structure of packet data according to the embodiments of the present invention. In FIG. 10, a structural example of packet data transferred between the LAP-D driver 23 and the bridge processing section 21 in the lower layer 20 in the structural example of the packet transfer node shown in FIG. 8 is shown.

Packet data 800 includes reception interface identification information 810, a packet size 820, and a packet body 830.

The reception interface identification information 810 is interface identification information indicating a communication link via which the packet data is transferred, and is set, for example, by the LAP-D driver 23. The reception interface identification information 810 can be any information that can identify a communication link, such as a MAC address and a port number.

In known packet transfer nodes, this interface information is directly delivered to the routing processing section 11 in the higher layer 10 without being used in the lower layer 20.

According to the embodiment, the reception interface identification information 810 is compared with the reception interface identification information 221 set in the bridge control table 22 shown in FIGS. 9A-9D. If a corresponding entry with the corresponding transfer destination identification information 222 is found in the bridge control table 22, bridge processing is performed. That is, the packet body 830 is extracted by referring to the packet size 820, and the packet body 830 is transferred to the communication link indicated by the transfer destination interface identification information 222 without delivering the packet body 830 to the higher layer 10.

In the second embodiment, bridge specification information 831, or a bridge flag 831, is stored, for example, in part of the packet body 830, although the embodiment is not limited to such a configuration and the bridge flag 831 can be set according to any known technique.

The packet body 830 includes a header part and a payload part (not shown in FIG. 10), and a bridge flag 831 can be stored in any one of the header part and the payload part.

For a packet transfer node according to the second embodiment, when the bridge specification information 831 in the packet data 800 delivered from the LAP-D driver 23 indicates "ON", the bridge control table 22 in the lower layer 20 is referred to, and if the corresponding transfer destination interface identification information is set bridge processing is performed. If the corresponding transfer destination interface identification information is not set in the bridge control table 22, "OFF" is set to the bridge specification information 831, and the packet body 830 is delivered to the higher layer 10.

FIG. 11 is a flowchart showing bridge processing according to the first embodiment.

In step S10, the reception interface identification information 810 is extracted from the packet data 800 shown in FIG. 10 by a bridge processing section 21.

In step S020, the bridge control table 22 is searched using, as a key, the reception interface identification information 810 extracted in step S010 by the bridge processing section 21.

In step S030, if an entry that corresponds to the reception interface identification information 810 exists in the bridge control table 22 (if the determination in step S030 is YES), the processing proceeds to step S040. If an entry that corresponds to the reception interface identification information 810 does not exist in the bridge control table 22 (if the determination in step S030 is NO), the processing proceeds to step S060.

In step S040, it is determined, by the bridge processing section 21, whether transfer destination interface identification information is set corresponding to the reception interface entry found in step S030. If the transfer destination interface identification information is set (if the determination in step S040 is YES), the processing proceeds to step S050. If transfer destination interface identification information is not set (if the determination in step S040 is NO), the processing proceeds to step S060.

In step S050, the packet body 830 is transferred by the bridge processing section 21 to a communication link indicated by the transfer destination interface identification information extracted in step S040, and the lower layer 20 processing is terminated without delivering the packet data 800 to the higher layer 10. That is, bridge processing in the lower layer 20 is performed.

In step S060, the packet is subjected to routing processing in the higher layer 10, and the lower layer 20 processing is terminated.

As described above, in the first embodiment, a communication link used for bridge processing is provided independent of an existing communication link, and interface identification information on the communication link used for bridge processing is set in advance in the bridge control table 22. Thus, packet transfer can be performed via the communication link used for bridge processing without affecting the known routing processing performed in the higher layer 10.

FIG. 12 is a flowchart showing bridge processing according to the second embodiment.

In the bridge processing shown in FIG. 12 according to the second embodiment, processing of extracting bridge specification information 831 from a packet and determining the bridge specification information (step S005) and processing of resetting the bridge specification information (step S055) are added to the bridge processing shown in FIG. 11 according to the first embodiment.

In step S005, bridge specification information 831 set in a received packet is extracted. If a value indicating that the packet is a target of bridge processing (for example, "ON") is set (if the determination in step S005 is YES), the processing proceeds to step S010. If a value indicating that the packet is not a target of bridge processing (for example, "OFF") is set (if the determination in step S005 is NO), the processing proceeds to step S060.

In step S010, the reception interface identification information 810 is extracted from the packet data 800 shown in FIG. 10 by a bridge processing section 21.

In step S020, the bridge control table 22 is searched using, as a key, the reception interface identification information 810 extracted in step S010 by the bridge processing section 21.

In step S030, if an entry that corresponds to the reception interface identification information 810 exists in the bridge control table 22 (if the determination in step S030 is YES), the processing proceeds to step S040. If an entry that corresponds to the reception interface identification information 810 does not exist in the bridge control table 22 (if the determination in step S030 is NO), the processing proceeds to step S055.

In step S040, it is determined, by a bridge processing section 21, whether transfer destination interface identification information is set for the reception interface entry found in step S030. If transfer destination interface identification information is set (if the determination in step S040 is YES), the processing proceeds to step S050. If transfer destination interface identification information is not set (if the determination in step S040 is NO), the processing proceeds to step S055.

In step S050, a packet is transferred to a communication link indicated by the transfer destination interface identification information extracted in step S040, and the lower layer 20 processing is terminated without delivering the packet data 800 to the higher layer 10.

In step S055, the bridge specification information in the packet is reset (set to "OFF").

In step S060, the packet is subjected to routing processing in the higher layer 10, and the processing is terminated.

As described above, in the second embodiment, bridge specification information, which is identification information indicating whether or not a packet is a target of bridge processing, is provided. If the bridge specification information is not set (indicates "OFF"), the packet is subjected to routing processing in the higher layer. If the bridge specification information indicates "ON", bridge processing in the lower layer can be performed on the basis of the bridge control table 21a, using a communication link identical to the communication link used for routing processing in the higher layer. Thus, it is unnecessary to provide a communication link used for bridge processing, unlike the first embodiment.

The described embodiment processes are implemented in software and/or computing hardware. An apparatus, a method, and computer-readable media according to the embodiment are provided. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to falling within the scope thereof.

What is claimed is:

1. A method, comprising:
providing a packet transfer node with hierarchical packet processing layers including a higher layer and a lower layer, the higher layer having a routing function to transfer a first packet among a first set of packet transfer nodes within one of one or more network areas in a network and/or among the one or more network areas, the lower layer having a function to transfer a second packet among a second set of packet transfer nodes in the network, the lower layer further including a driver for performing data communication via one or more communication links provided for the packet transfer node, and a bridge processing section for controlling a packet transfer and transferring the second packet among the second set of packet transfer nodes in the network;
receiving, by the driver, a first incoming packet from a first communication link;
building, by the driver, a second incoming packet by appending reception interface identification information identifying the first communication link to the first incoming packet so that the second incoming packet includes both the reception interface identification information and the first incoming packet;
determining, by the bridge processing section, whether the first incoming packet included in the second incoming packet is the first packet to be transferred by the higher layer or the second packet to be transferred by the lower layer, based on the reception interface identification information included in the second incoming packet;
passing, by the bridge processing section, the second incoming packet to the higher layer when determined that the first incoming packet included in the second incoming packet is the first packet; and
performing, by the bridge processing section, packet transfer processing on the second incoming packet within the lower layer without passing the second incoming packet to the higher layer when determined that the first incoming packet included in the second incoming packet is the second packet, so as to allow the higher layer to perform packet processing without being affected by packet processing of the lower layer,
wherein when it is determined that the first incoming packet included in the second incoming packet is the second packet, the bridge processing section extracts the first incoming packet from the second incoming packet and transfers, within the lower layer, the extracted first incoming packet directly to a second communication link with no extra information added to outside of the extracted first incoming packet.

2. The method of claim 1, further comprising:
defining, by the higher layer, the one or more network areas in the network,
performing, by the higher layer, routing processing on the first packet wherein the first packet is transferred among the first set of packet transfer nodes, within one of the one or more network areas and/or among the one or more network areas;
providing the bridge processing section with a bridge control table; and
performing, by the bridge processing section based on the bridge control table, bridge processing on the second packet, wherein the second packet is transferred among the second set of packet transfer nodes in the network.

3. The method of claim 2, wherein
the bridge control table is capable of storing the reception interface identification information in association with transfer destination interface identification information identifying the second communication link, and
the bridge processing section performs the bridge processing on the second incoming packet when the bridge control table is storing same reception interface identification information as that included in the second incoming packet in association with corresponding transfer destination interface identification information identifying the second communication link, and otherwise the bridge processing section passes the second incoming packet to the higher layer so that routing processing in the higher layer is performed on the second incoming packet.

4. The method of claim 3, wherein the reception interface identification information and the transfer destination interface identification information are MAC addresses that are assigned to the first communication link and the second communication link, respectively.

5. The method of claim 3, wherein the reception interface identification information and the transfer destination interface identification information are port numbers that are assigned to the first communication link and the second communication link, respectively.

6. The method of claim 3, wherein
the routing processing in the higher layer is performed by transferring the first packet to another packet transfer node via a third communication link connecting the packet transfer node to another packet transfer node provided between the first packet transfer nodes, and
the bridge processing in the lower layer is performed by transferring the second packet to the another packet transfer node via a fourth communication link connecting the packet transfer node to the another packet transfer node.

7. The method of claim 2, wherein
a bridge specification information indicating whether the bridging processing is to be performed or not, is set to the first incoming packet to be transferred, by a source packet transfer node from which the first incoming packet has originated.

8. The method of claim 7, wherein
the bridge processing section performs the bridge processing on the second incoming packet, when the bridge specification information included in the first incoming packet indicates that the bridging processing is to be performed, and when the bridge control table is storing same reception interface identification information as that including in the second incoming packet in association with the corresponding transfer destination interface identification information identifying the second communication link, and
otherwise, the bridge processing section passes the second incoming packet to the higher layer so that the routing processing in the higher layer is performed on the second incoming packet.

9. The method of claim 2, further comprising:
receiving, by a first packet transfer node belonging to a first network area, the first incoming packet, via the first communication link of the first packet transfer node, from an additional packet transfer node adjoining the first network area;
transferring, by the first packet transfer node, the first incoming packet, via the second communication link of the first packet transfer node, to a second packet transfer node belonging to a second network area, wherein
the bridge processing section included in the first packet transfer node performs packet transfer processing on the second incoming packet without passing the second incoming packet to the higher layer, so as to directly transfer the first incoming packet included in the second incoming packet to the second communication link without affecting packet transfer processing that is performed on the first packet by the higher layer.

10. The method of claim 1, wherein the higher layer performs the routing processing defined by the OSI network.

11. The method of claim 3, wherein, in the bridge control table, the reception interface identification information is set by a user terminal connected to the packet transfer node, in association with the transfer destination interface information.

12. A packet transfer node, comprising:
hierarchical packet processing layers including a higher layer and a lower layer, the higher layer including a routing processing section for transferring a first packet among a first set of packet transfer nodes within one of one or more network areas defined in a network and/or among the one or more network areas, the lower layer including a bridge processing section and a driver, the bridge processing section controlling a packet transfer and for transferring a second packet among a second set of packet transfer nodes in the network, the driver performing data communication via one or more communication links provided for the packet transfer node, wherein
the driver receives a first incoming packet from a first communication link and builds a second incoming packet by appending reception interface identification information identifying the first communication link to the first incoming packet so that the second incoming packet includes both the reception interface identification information and the first incoming packet;
the bridge processing section determines whether the first incoming packet received from the first communication link is the first packet to be transferred by the routing processing section or the second packet to be transferred by the bridge processing section, based on the reception interface identification information included in the second incoming packet;
the bridge processing section passes the second incoming packet to the routing processing section, when determined that the first incoming packet included in the second incoming packet is the first packet; and
the bridge processing section performs packet transfer processing on the second incoming packet without passing the second incoming packet to the routing processing section in the higher layer, when determined that the first incoming packet included in the second incoming packet is the second packet, so as to allow the higher layer to perform packet processing without being affected by packet processing of the lower layer,
wherein when it is determined that the first incoming packet included in the second incoming packet is the second packet, the bridge processing section extracts the first incoming packet from the second incoming packet and transfers, within the lower layer, the extracted first incoming packet directly to the second communication link with no extra information added to outside of the extracted first incoming packet.

13. The packet transfer node of claim 12, further comprising:
a bridge control table in the lower layer, the bridge control table being capable of storing the reception interface identification information identifying the first communication link, in association with transfer destination interface identification information identifying the second communication link.

14. The packet transfer node of claim 13, wherein
the bridge processing section performs the bridge processing on the second incoming packet when the bridge control table is storing same reception interface identification information as that included in the second incoming packet in association with a corresponding transfer destination interface identification information identifying the second communication link, and otherwise the bridge processing section passes the second incoming packet to the routing processing section so that the routing processing in the higher layer is performed on the second incoming packet.

15. The packet transfer node of claim 14, wherein
the routing processing section in the higher layer transfers the first packet to another packet transfer node via a third communication link connecting the packet transfer node to the another packet transfer node, and the bridge processing section in the lower layer transfers the second packet to the another packet transfer node via a fourth communication link connecting the packet transfer node to the another packet transfer node.

16. The packet transfer node of claim 13, wherein
a bridge specification information indicating whether the bridging processing is to be performed or not, is set to the first incoming packet to be transferred, by a source packet transfer node from which the first incoming packet has originated, and
the bridge processing section performs bridge processing on the second incoming packet when the bridge specification information included in the first incoming packet indicates that the bridging processing is to be performed, and when the bridge control table is storing same reception interface identification information as that included in the second incoming packet in association with a corresponding transfer destination interface identification information identifying the second communication link, and
otherwise, the bridge processing section passes the second incoming packet to the routing processing section so that routing processing in the higher layer is performed on the second incoming packet.

* * * * *